United States Patent
Beinor, Jr. et al.

(10) Patent No.: US 6,560,098 B1
(45) Date of Patent: May 6, 2003

(54) DISK DRIVE MODULE

(75) Inventors: Albert F. Beinor, Jr., Sutton, MA (US);
Ilhan Gundogan, Lexington, MA (US);
Joseph P. Deyesso, Walpole, MA (US);
Joseph P. King, Jr., Sterling, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/894,804

(22) Filed: Jun. 29, 2001

(51) Int. Cl.⁷ .................................................. G06F 1/16
(52) U.S. Cl. ........................ 361/685; 361/682; 361/752; 361/725; 312/223.1; 248/562
(58) Field of Search ............................... 361/725, 752, 361/682, 685, 683–684, 741, 751, 756, 788, 796, 829; 312/223.1, 223.2, 265.6, 257.1; 248/562, 636, 638, 560; 360/97.01, 97.02; 250/239, 216; 439/928.1, 60, 152–153, 157, 327–328, 331, 304, 345

(56) References Cited

U.S. PATENT DOCUMENTS

| | | | | |
|---|---|---|---|---|
| 6,058,016 A | * | 5/2000 | Anderson et al. | 361/727 |
| 6,282,087 B1 | * | 8/2001 | Gibbons et al. | 361/685 |
| 6,288,902 B1 | * | 9/2001 | Kim et al. | 361/725 |
| 6,317,329 B1 | * | 11/2001 | Dowdy et al. | 361/725 |
| 6,325,353 B1 | * | 12/2001 | Jiang | 248/682 |
| 6,371,433 B2 | * | 4/2002 | Anderson et al. | 248/562 |
| 6,378,965 B1 | * | 4/2002 | Reznikov et al. | 312/332.1 |
| 6,424,523 B1 | * | 7/2002 | Curtis et al. | 361/685 |
| 6,450,597 B1 | * | 9/2002 | Bell et al. | 312/223.1 |
| 6,473,300 B1 | * | 10/2002 | Youngquist et al. | 361/685 |
| 6,480,391 B1 | * | 11/2002 | Monson et al. | 361/752 |
| 6,483,107 B1 | * | 11/2002 | Rabinovitz et al. | 250/239 |

* cited by examiner

Primary Examiner—Gerald Tolin
Assistant Examiner—Michael Datskovsky
(74) Attorney, Agent, or Firm—Kriegsman & Kriegsman

(57) ABSTRACT

A disk drive module is adapted to be slidably disposed within the chassis of a data storage system. The disk drive module includes a fiber channel disk drive for storing data, an upper carrier sled mounted onto the disk drive and a lower carrier sled mounted onto the disk drive. A bezel assembly is snap mounted onto the upper and lower carrier sleds. The bezel assembly includes a bezel which is capable of lateral displacement relative to the upper carrier sled, an ejector pivotally mounted onto the bezel for releasably locking the disk drive module within the chassis, and a latch for releasably locking the position of the ejector. An adaptive spring includes a first end which is mounted onto the upper carrier sled and a second end which abuts against the bezel, the adaptive spring resiliently urging the bezel away from the upper carrier sled.

25 Claims, 10 Drawing Sheets

DISK DRIVE MODULE

BACKGROUND OF THE INVENTION

The present invention relates generally to data storage systems and more particularly to disk drive modules for data storage systems.

Data storage systems are well known in the art and are commonly used in commerce.

Data storage systems are used within a computer network to store large amounts of data. For example, data storage systems may be used to consolidate information in highly distributed critical standalone server environments which, in turn, can be used to run electronic commerce, or e-commerce, over the internet.

For example, the CLARIION line of data storage systems, which is manufactured and sold by EMC CORPORATION of Hopkinton, Mass., is one well known line of midrange data storage systems.

Data storage systems typically comprise a plurality of individual disk drive modules which are removably disposed within a data storage system chassis. The individual disk drives include an interface which is electrically connected to an associated interface which, in turn, is electrically connected to the motherboard for the data storage system.

Disk drive modules which include a small computer system interface (SCSI) are well known in the art and are commonly referred to simply as SCSI disk drives. SCSI disk drives include an SCSI interface which can be matingly connected to a corresponding SCSI interface which, in turn, is electrically connected to the motherboard of the data storage system.

Although well known and widely used in the art, disk drives modules which comprise a SCSI interface suffer from a principal drawback. Specifically, electrical signals which pass between a pair of SCSI interfaces are required to travel a relatively long distance. As a result, it has been found that the relatively long signal travel distance worsens the performance of the disk drive module within the system, which is highly undesirable. In particular, most SCSI interfaces provide for data transmission rates in the range from approximately 4 MBps to 10 MBps, which is unacceptable in many applications.

Accordingly, fibre channel disk drive modules are well known in the art. A fibre channel disk drive module comprises a full fibre channel interface to improve the quality of signal transmission between the disk drive module and the data storage system motherboard, which is highly desirable. Specifically, a fibre channel disk drive module utilizes optical fiber to connect the disk drive module to the data storage system motherboard. It should also be noted that the fibre channel connector of a fibre channel disk drive module can be directly plugged into an associated fibre channel connector which is mounted onto the mid-plane printed circuit board (PCB) of the data storage system, the mid-plane PCB being disposed vertically within the data storage system between the disk drive modules and the power supplies. As a result, the signal travel distance between the disk drive module and the data storage system is shortened which, in turn, improves the performance of the disk drive module within the system. As can be appreciated, disk drives modules which utilize fibre channel connectors are capable of supporting full-duplex data transfer rates of approximately 100 Mbps, which is considerably faster than the transfer rates that can be achieved using SCSI connectors. As a result, fibre channel connectors are used with disk drive modules, and other types of peripheral devices associated with data storage, that require very high bandwidth.

Although well known and widely used in the art, fibre channel disk drive modules which can be slidably mounted into a portion of the chassis of a data storage system suffer from a notable drawback. Specifically, it has been found that the internal rotational speed of the disk drive within the disk drive module creates rotational vibrations (RV) in the disk drive module which, in turn, can negatively effect performance, which is highly undesirable.

Accordingly, it is well known in the art to size and shape each individual disk drive module in such a manner that the module can be slidably disposed within the data storage system chassis with a tight, secure fit. In addition, each individual disk drive module is often constructed to include grommets to further wedge the module tightly within the chassis. The aforementioned techniques serve to effectively wedge each individual disk drive module securely in place within the chassis in such a manner that the module is no longer capable of vibrating.

Although well known and widely used in the art, the aforementioned technique of tightly wedging individual fibre channel disk drive modules into a data storage system chassis suffers from a few notable drawbacks.

As an example, the aforementioned technique of tightly wedging individual fibre channel disk drive modules into a data storage system chassis does not adequately compensate for tolerances in the size of the chassis. Specifically, standard manufacturing tolerances create size variances in the data storage system chassis. As a result, an individual disk drive module could potentially be disposed within a plurality of different sized chassis. Accordingly, it has been found that manufacturing tolerances in the size of the chassis can significantly compromise the effectiveness of the connection between the fibre channel connector of the module and its associated fibre channel connector on the mid-plane PCB. In fact, it has been found that manufacturing tolerances in the size of the chassis can compromise the effectiveness of the connection between the fibre channel connector on the module and the fibre channel connector on the mid-plane PCB by approximately fifty percent, which is highly undesirable.

As another example, the aforementioned technique of tightly wedging individual fibre channel disk drive modules into a data storage system chassis provides the user with an undesirable ergonomic feel. Specifically, it has been found that constructing the module to fit tightly within the chassis significantly increases the force required to insert the module into the chassis and the force required to remove the module from the chassis, which is highly undesirable.

As another example, the aforementioned technique of tightly wedging individual fibre channel disk drive modules into a data storage system chassis creates wear and tear on each of the modules. In particular, it has been found that significant wear and tear occurs around the around the grommets of each module because it is that location on the module where the retentive force of the module within the chassis is the greatest.

As another example, the aforementioned technique of tightly wedging individual fibre channel disk drive modules into a data storage system chassis necessitates that the disk drive module include a handle which is adequately sized so as to enable the user to manually position the module in and out of the chassis. Accordingly, fibre channel disk drive modules are often constructed to include an enlarged handle for grasping the disk drive module. As can be appreciated, it has been found that the implementation of an enlarged handle on a disk drive module greatly increases the overall size of the disk drive module, which is highly undesirable.

SUMMARY OF THE INVENTION

It is an object of the present invention to provide a new and improved disk drive module.

It is another object of the present invention to provide a disk drive module as described above which can be easily slid into and from the chassis of a data storage system.

It is yet another object of the present invention to provide a disk drive module as described above which includes a fibre channel interface which electrically and mechanically interconnects with an associated fibre channel interface which is mounted onto a mid-plane printed circuit board for the data storage system.

It is still another object of the present invention to provide a disk drive module as described above which produces limited rotational vibrations.

It is yet still another object of the present invention to provide a disk drive module as described above which compensates for tolerances in the size of the chassis into which the module is disposed.

It is another object of the present invention to provide a disk drive module as described above which is aesthetically and ergonomically pleasing.

It is yet another object of the present invention to provide a disk drive module as described above which has a limited number of parts, which is easy to use and which is inexpensive to manufacture.

Accordingly, there is provided a disk drive module, comprising a disk drive for storing data, an upper carrier sled mounted onto said disk drive, a lower carrier sled mounted onto said disk drive, a bezel assembly mounted onto said upper and lower carrier sleds, and an adaptive spring having a first end fixedly mounted onto said upper carrier sled and a second end disposed against said bezel assembly, said adaptive spring resiliently urging said bezel assembly away from said upper carrier sled.

Various other features and advantages will appear from the description to follow. In the description, reference is made to the accompanying drawings which form a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 1:
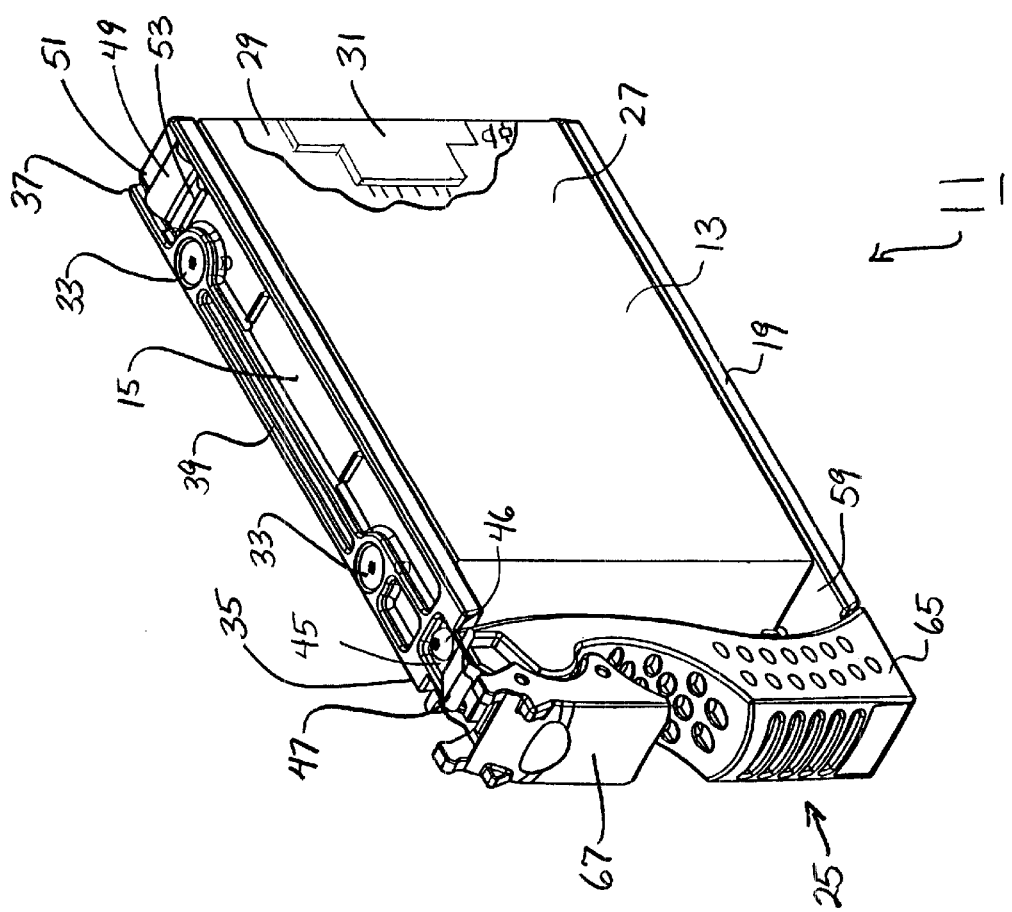
FIG. 1 is a front perspective view, broken away in part, of a disk drive module constructed according to the teachings of the present invention.
Figure 2:
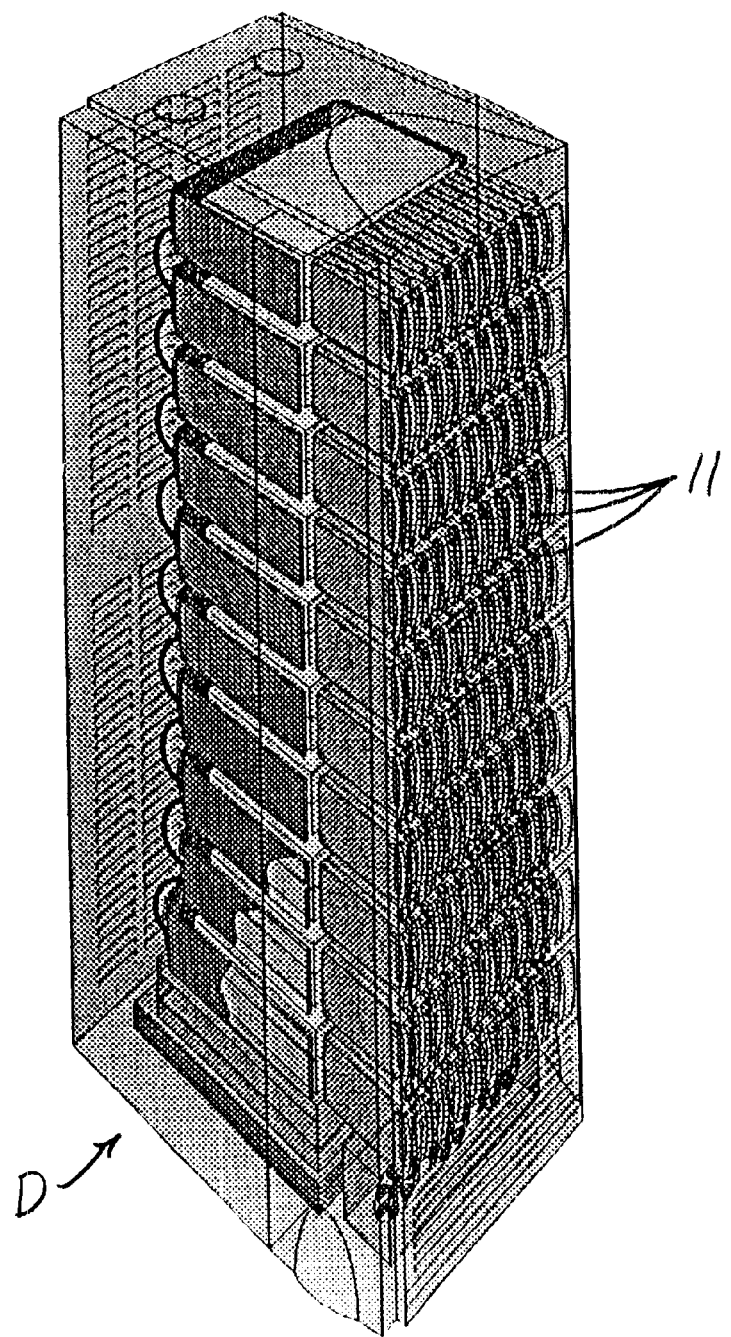
FIG. 2 is a front perspective view of a data storage system which includes a plurality of the disk drive modules shown in FIG. 1 disposed therewithin.
Figure 10:
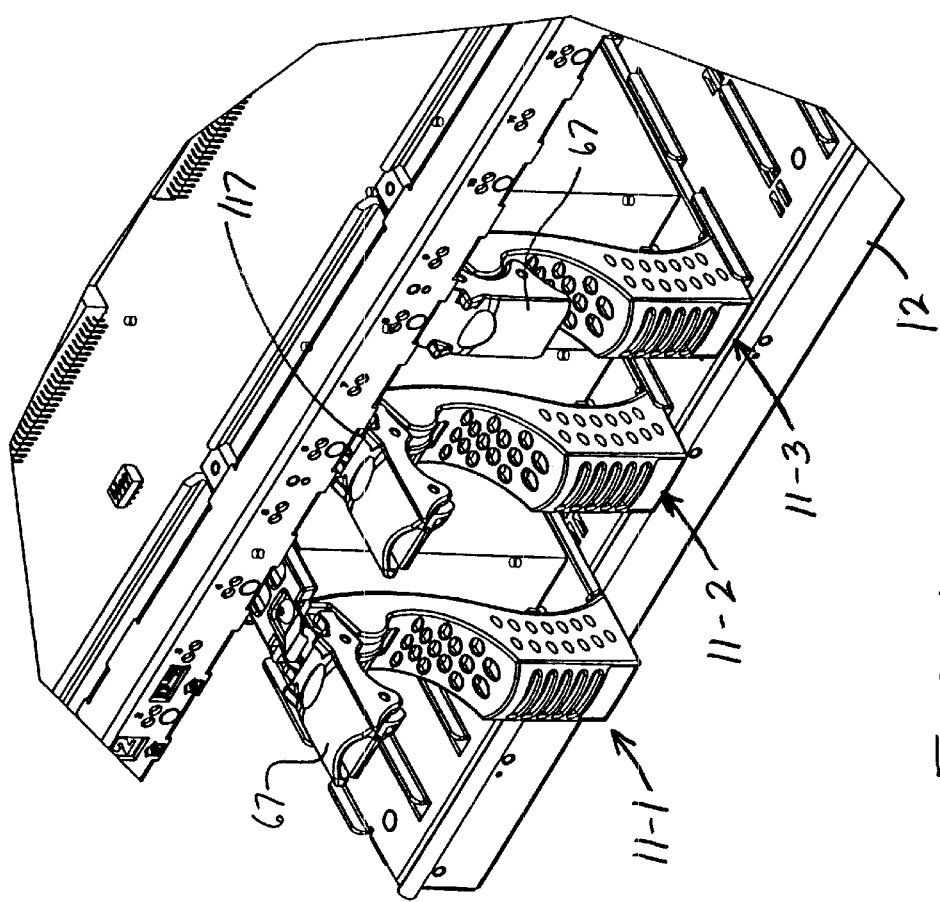
FIG. 10 is a front, fragmentary, perspective view of a plurality of the disk drive modules shown in FIG. 1, each disk drive module being shown at particular stage during the process of being slidably disposed within a portion of the chassis of a data storage system.

Referring now to FIG. 1, there is shown a disk drive module constructed according to the teachings of the present invention, the disk drive module being identified generally by reference numeral 11. As can be appreciated, disk drive module 11 is adapted to be slidably disposed within a portion of the chassis 12 of a data storage system D, as shown in FIGS. 2 and 10. In this capacity, disk drive module 11 can be used in the data storage system to store large amounts of data.

Disk drive module 11 comprises a disk drive 13 for storing data, an upper carrier sled 15 mounted onto disk drive 13, an upper isolation pad 17 disposed between disk drive 13 and upper carrier sled 15, a lower carrier sled 19 mounted onto disk drive 13, a lower isolation pad 21 disposed between disk drive 13 and lower carrier sled 19, an adaptive spring 23 mounted onto upper carrier sled 15, and a bezel assembly 25 mounted onto upper carrier sled 15 and lower carrier sled 19.

Disk drive 13 represents any conventional disk drive which is used to store data. It should be noted that disk drive 13 comprises, inter alia, a protective outer housing, or grill, 27, a disk drive printed circuit board 29 which is protected by housing 27 and a fibre channel connector 31 mounted onto printed circuit board 29. Fibre channel connector 31 is mounted onto disk drive printed circuit board 29 in such a manner so that, as disk drive module 11 is slidably disposed within data storage system chassis 12, fibre channel connector 31 is positioned to matingly engage a corresponding fibre channel connector (not shown) which is mounted onto a mid-plane printed circuit board in data storage system D, thereby electrically and mechanically coupling individual disk drive module 11 with data storage system D.

Upper carrier sled 15 is mounted onto the top edge of disk drive 13 by shoulder screws 33. Upper carrier sled 15 is preferably constructed of a dense metal material, such as zinc, and can be manufactured using conventional die casting techniques. Upper carrier sled 15 comprises a front end 35, a rear end 37, a top surface 39 and a bottom surface 41. A finger 42 is integrally formed onto and projects perpendicularly out from bottom surface 41 at front end 35.

A front rotational vibration (RV) spring 43 is mounted onto top surface 39 of upper carrier sled 15 proximate front end 35. Front RV spring 43 is a leaf spring which includes a first end 45 which is affixed onto top surface 39 of upper carrier sled 15 by a thread forming screw 46 which engages upper carrier sled 15. Front RV spring 43 also includes a second end 47 which projects up at an acute angle from top surface 39 of upper carrier sled 15. Second end 47 is free to pivot towards and away from top surface 39 of carrier sled 15. As can be appreciated, front RV spring 43 is disposed to selectively engage the interior of the data storage system chassis 12, thereby retaining the disk drive module 11 in place within the chassis.

Figure 3:
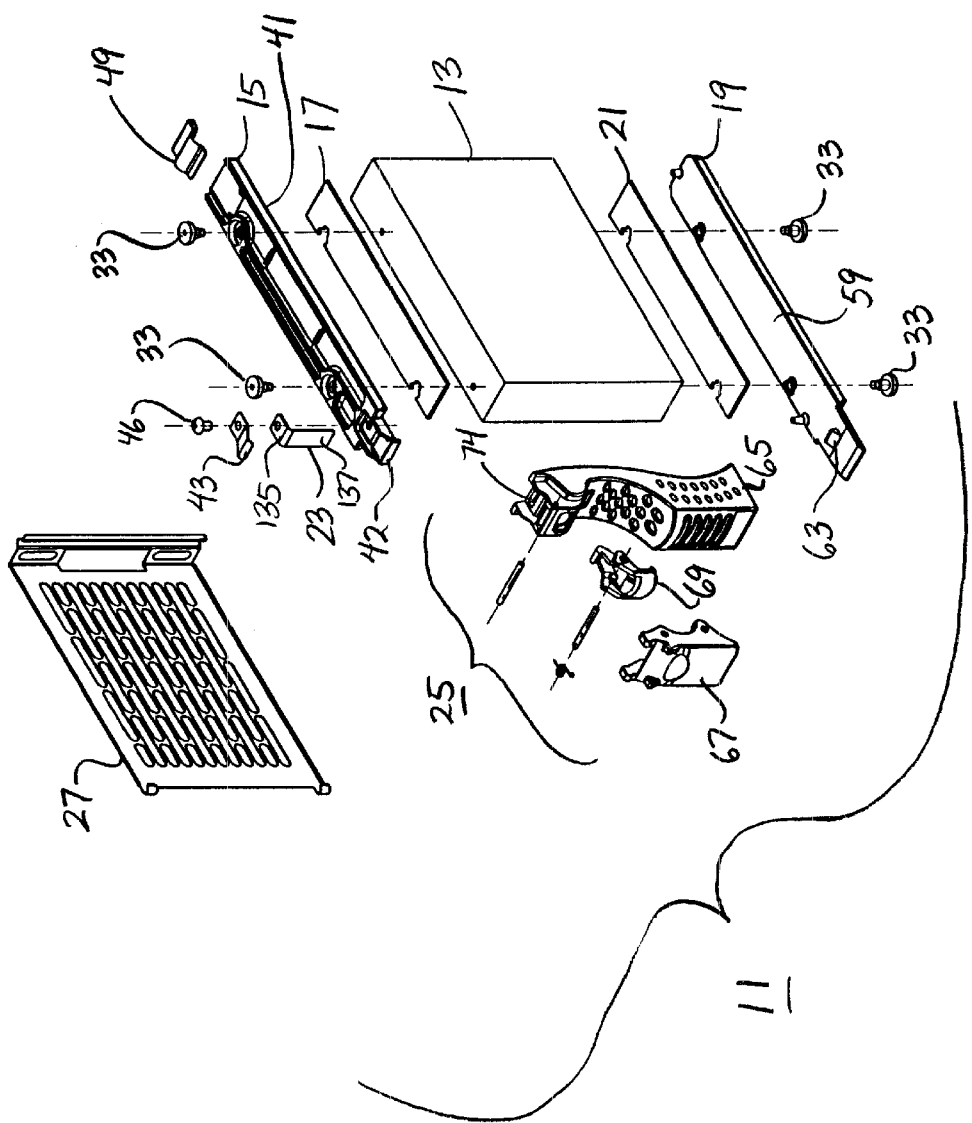
FIG. 3 is an exploded, front perspective view of the disk drive module shown in FIG. 1.
Figure 4:
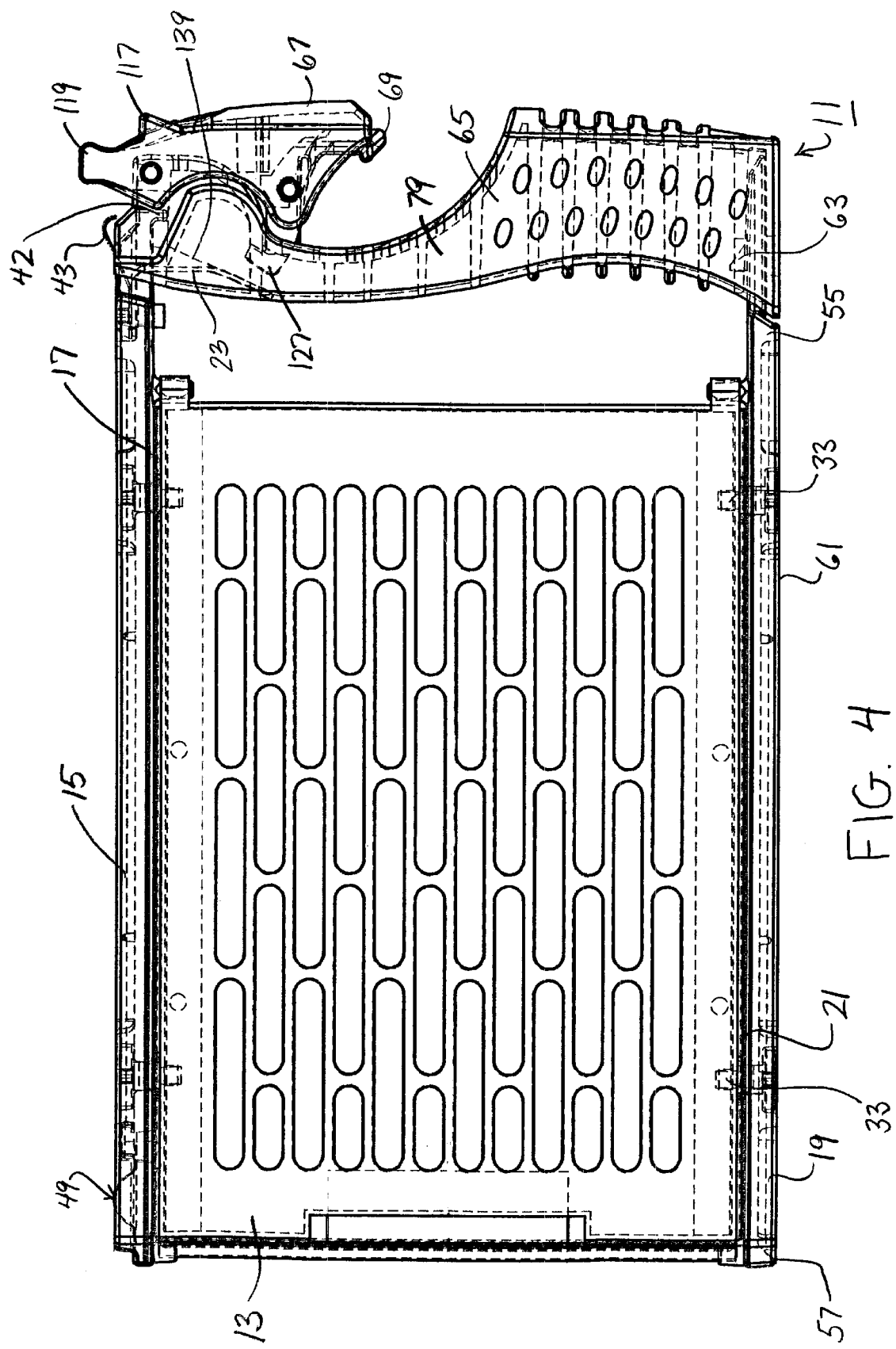
FIG. 4 is a left side view of the disk drive module shown in FIG. 1.
Figure 5:
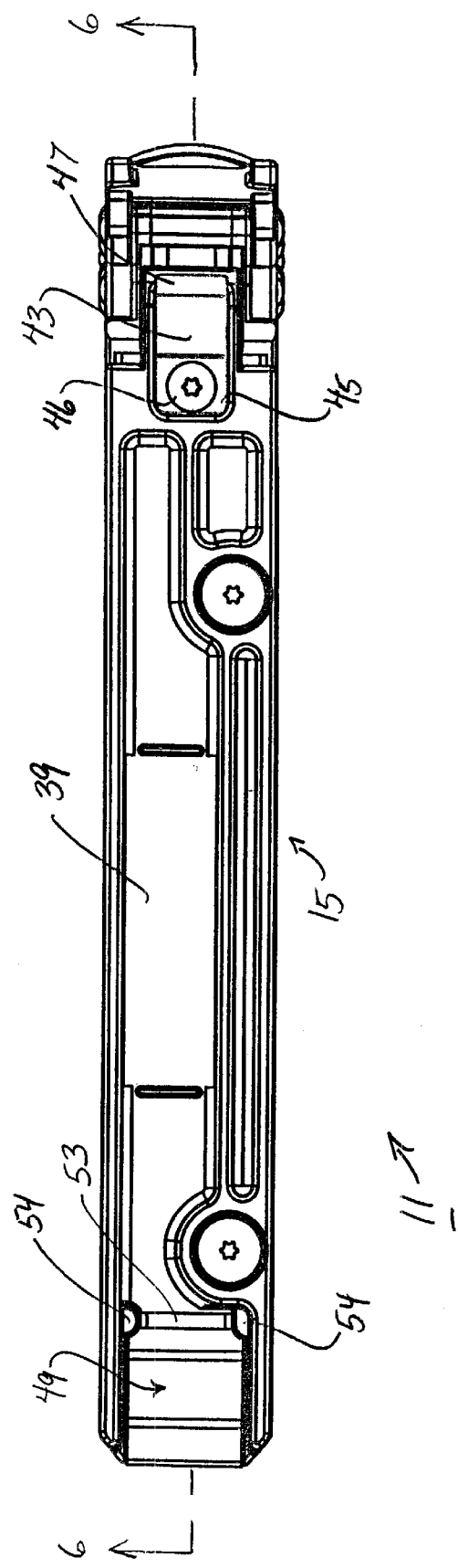
FIG. 5 is a top view of the disk drive module shown in FIG. 1.

A rear rotational vibration (RV) spring 49 is mounted onto the top surface 39 of upper carrier sled 15 proximate rear end 37. Rear RV spring 49 is a leaf spring comprising a first end 51 which is wrapped around rear end 37 and affixed onto bottom surface 41 of upper carrier sled 15 by a pair of pins. Rear RV spring 49 also includes a second end 53 which is retained against top surface 39 of upper carrier sled 15 by a pair of tabs 54. As shown in FIG. 3, first end 51 and second end 53 of rear RV spring 49 are affixed onto upper carrier sled 15 in such as manner so as to provide rear RV spring 49 with a generally convex curvature. As such, rear RV spring 49 is capable of being flattened upon the application of a force thereon, rear RV spring 49 returning to its original convex curvature upon removal of the flattening force. As can be appreciated, rear RV spring 49 is disposed to selectively engage a dimple, or groove, formed on the interior surface of the data storage system chassis 12, thereby helping to retain disk drive module 11 in place within chassis 12.

Upper isolation pad 17 is preferably constructed of a vibration dampening material and is tightly disposed between upper carrier sled 15 and disk drive 13. As can be appreciated, upper isolation pad 17 serves to effectively integrate disk drive 13 with upper carrier sled 15, thereby enabling upper carrier sled 15 to help reduce rotational vibrations produced by disk drive 13.

Lower carrier sled 19 is mounted onto the bottom edge of disk drive 13 by shoulder screws 33. Lower carrier sled 19 is preferably constructed of a dense metal material, such as zinc, and can be manufactured using conventional die casting techniques. Lower carrier sled 19 comprises a front end 55, a rear end 57, a top surface 59 and a bottom surface 61.

A ratchet, or tooth, 63 is integrally formed onto top surface 59 of lower carrier sled 19 proximate front end 55. As will be described further in detail below, ratchet 63 serves to help lock bezel assembly 25 onto lower carrier sled 19.

Lower isolation pad 21 is preferably constructed of a vibration dampening material and is tightly disposed between disk drive 13 and lower carrier sled 19. As can be appreciated, lower isolation pad 21 serves to effectively integrate disk drive 13 with lower carrier sled 19, thereby enabling upper lower carrier sled 19 to help reduce rotational vibrations produced by disk drive 13.

Figure 8:
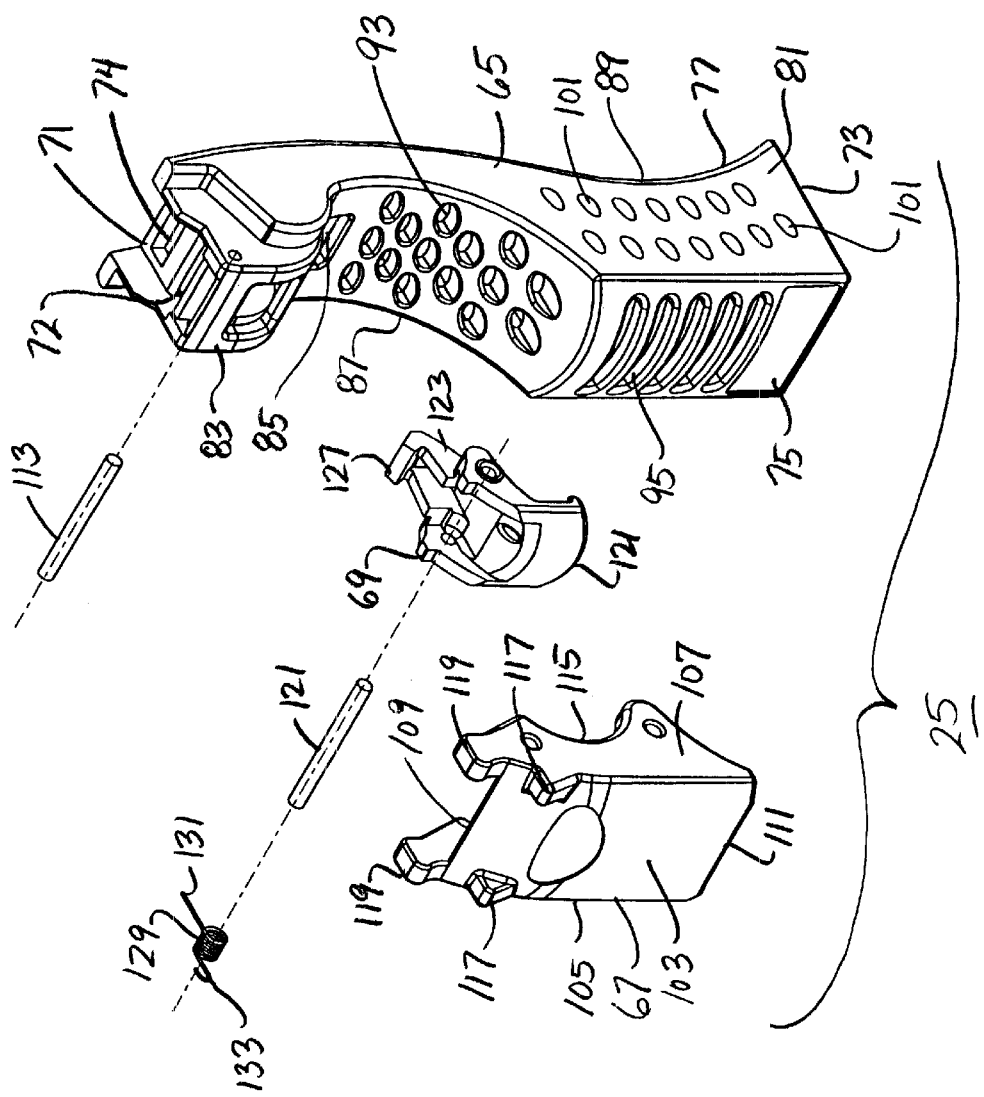
FIG. 8 is an exploded perspective view of the bezel assembly shown in FIG. 1.

As shown in FIG. 8, bezel assembly 25 comprises a bezel 65, an ejector 67 pivotally mounted onto bezel 65 and a latch 69 pivotally spring mounted onto ejector 67.

Bezel 65 is preferably constructed of a conductive, antistatic resin. As can be appreciated, the conductive nature of bezel 65 allows for electricity which is present on the hand of an operator who is handling disk drive module 11 to be discharged before the electricity contacts hard drive 13, which is highly desirable.

Bezel 65 is an elongated member which is shaped to conform to the hand of an operator, thereby enabling the user to easily handle disk drive module 11. Bezel 65 comprises a top surface 71, a bottom surface 73, a front surface 75, a back surface 77, a left side surface 79 and a right side surface 81. It should be noted that top surface 71 is shaped to define an upper carrier sled finger receptacle 72 and an adaptive spring receptacle 74, as will be described further below.

A rounded shoulder 83 is formed onto front surface 75 of bezel 65 proximate top surface 71. A square-shaped opening 85 is formed into front surface 75 directly beneath shoulder 83. A tab 86 is formed at the rear edge of rounded shoulder 83 and is disposed directly above opening 85. As will be described further below, opening 85 is sized and shaped to enable latch 69 to selectively project therethrough and snap-engage onto tab 86.

Front surface 75 is shaped to include an inward curvature 87. Similarly, back surface 77 is shaped to include an inward curvature 89. As can be appreciated, inward curvatures 87 and 89 enable one or more fingers of the operator to ergonomically contour to bezel 65, thereby facilitating handling of disk drive module 11, which is highly desirable.

Figure 6:
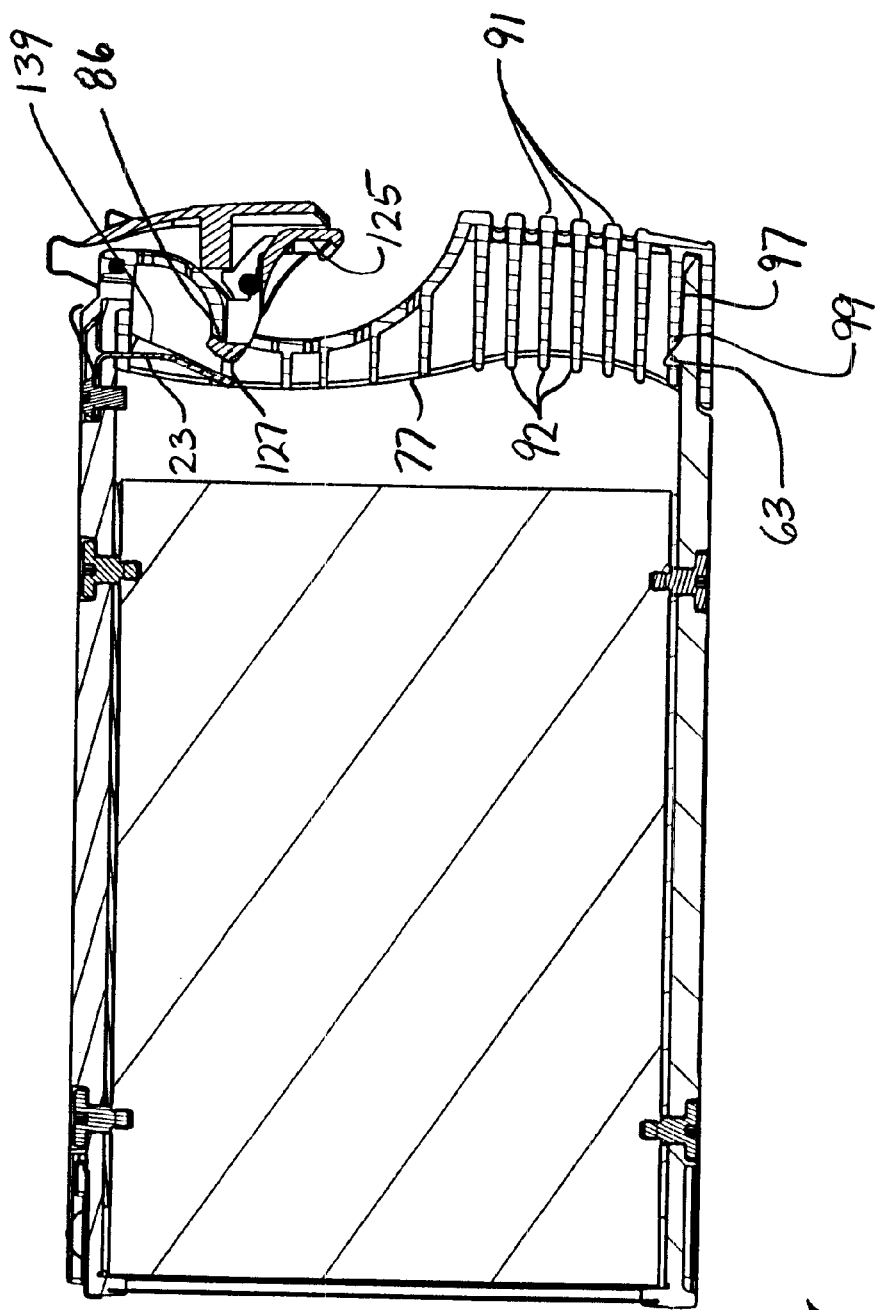
FIG. 6 is a section view of the disk drive module shown in FIG. 5, taken along lines 6—6.
Figure 7:
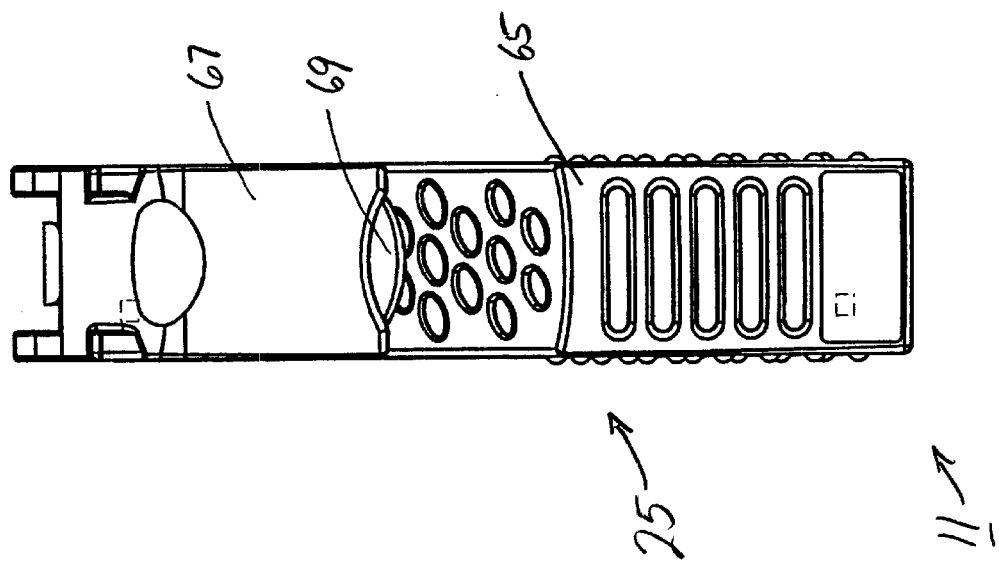
FIG. 7 is a front view of the disk drive module shown in FIG. 1.

Back surface 77 is substantially open in construction, as shown in FIG. 6. A plurality of horizontal, spaced apart, parallel stiffening ribs 91 are affixed between left side surface 79 and right side surface 81 along back surface 77, ribs 91 having a rounded back edge 92 to improve the feel of bezel 65. In addition, a plurality of oval-shaped openings 93 and a plurality of elongated horizontal openings 95 are formed in front surface 75. As can be appreciated, openings 93 and 95, as well as the substantially open design of back surface 77, enable air to travel through bezel 65 and cool disk drive 13, which is highly desirable.

A locking tab 97 is integrally formed onto front surface 75 and extends rearward in parallel with stiffening ribs 91, locking tab 97 being disposed between bottom surface 73 and the lowermost rib 91. Locking tab 97 includes a central opening 99 and is capable of upward and downward flexion.

As can be appreciated, tooth 63 and tab 97 enable bezel assembly 25 to be removably mounted onto upper carrier sled 15 and lower carrier sled 19 in the following manner. Specifically, bezel assembly 25 is positioned in such a manner that finger 42 on upper carrier sled 15 projects down into finger receptacle 72 in bezel 65 and adaptive spring 23 projects down into adaptive spring receptacle 74 in bezel, thereby securing bezel assembly 25 onto upper carrier sled 15.

With bezel assembly 25 secured onto upper carrier sled 15, bottom surface 73 of bezel 65 is pivoted inward in such a manner that front end 55 of lower carrier sled 19 projects between bottom surface 73 of bezel 65 and locking tab 97. As bezel 65 is pivoted further inward, locking tab 97 contacts tooth 63 on lower carrier sled 15, tooth 63 urging locking tab 97 upward. Bezel 65 is pivoted inward until tooth 63 snaps through central opening 99 in locking tab 97, thereby securing bezel assembly 25 onto lower carrier sled 19. As can be appreciated, locking tab 97 can be urged upward using a flat instrument, such as a screwdriver, to disengage bezel assembly 25 from upper and lower carrier sleds 15 and 19.

It should be noted that ability to removably mount bezel assembly 25 onto upper and lower carrier sleds 15 and 19 is highly advantageous in that bezel 65 can be manufactured separately from the remainder of disk drive module 11 and then can be mounted in a subsequent step, thereby reducing manufacturing costs, which is highly desirable.

A plurality of dimples 101 are formed onto left side surface 79 and right side surface 81 of bezel 65. As can be appreciated, dimples 101 are provided to facilitate handling bezel 65.

Ejector 67 is generally U-shaped in lateral cross-section and includes a top wall 103, a first sidewall 105, a second sidewall 107, a first end 109 and a second end 111.

Figure 9:
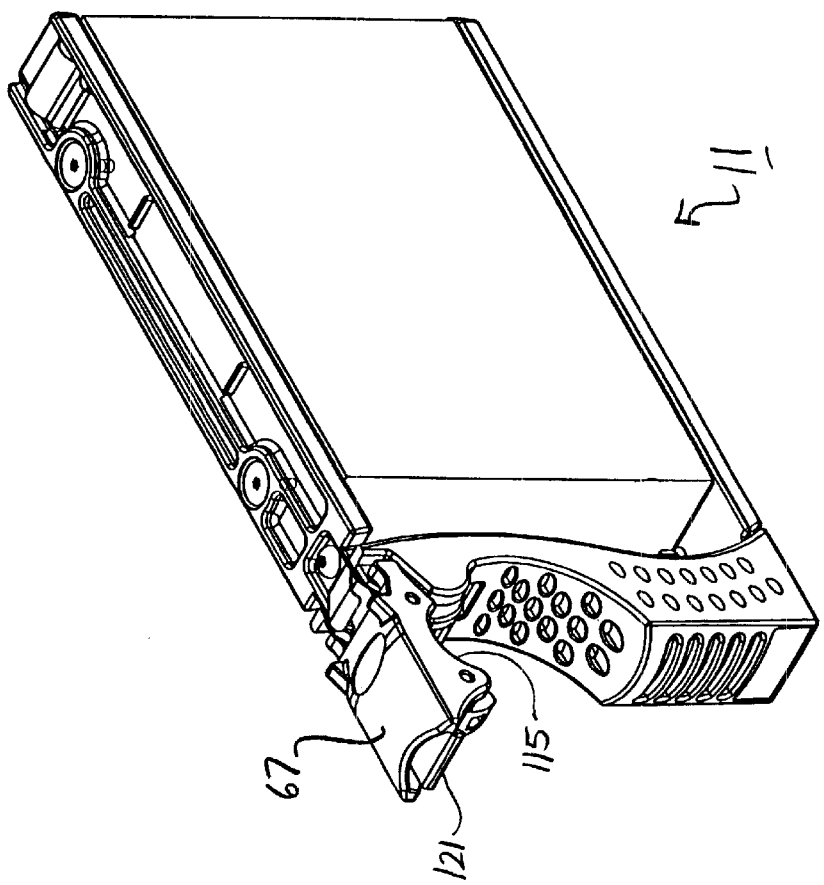
FIG. 9 is a front perspective view of the disk drive module shown in FIG. 1, the bezel assembly being shown in its unlocked position.

Ejector 67 is pivotally mounted onto rounded shoulder 83 of bezel 65 about a pin 113. As such, ejector 67 can be pivotally disposed between a substantially horizontal position, as shown in FIG. 9, and a substantially vertical position, as shown in FIG. 1. It should be noted that ejector 67 and bezel 65 are sized and shaped so that ejector 67 will remain in its horizontal position when so disposed.

As will be described further in detail below, with ejector 67 placed in its substantially horizontal position, bezel assembly 25 is disposed in unlocked position, thereby enabling disk drive module 11 to be freely slid in and out of chassis 12. Furthermore, with ejector 67 placed in its substantially vertically position, bezel assembly 25 is disposed in its locked position, thereby securing disk drive module 11 in place within chassis 12.

An arcuate recess 115 is formed in each of first and second sidewalls 105 and 107 to facilitate grasping of bezel assembly 25. Specifically, with ejector 67 disposed in its substantially horizontal position, recesses 115 contour to the general shape of a finger, thereby enabling an operator to pull disk drive module 11 out from chassis 12 with a single finger, which is highly desirable.

A pair of spaced apart, abutment fingers 117 are integrally formed onto the outer surface of top wall 103 proximate first end 109, each abutment finger 117 being generally triangular in longitudinal cross-section. As can be appreciated, with bezel assembly disposed in its unlocked position, disk drive module 11 can be slid into chassis 12 until abutment fingers 117 contact chassis 12, thereby limiting further insertion until bezel assembly 25 is disposed into its locked position, as will be described further in detail below.

A pair of engagement, or gripping, fingers 119 are integrally formed onto the outer surface of top wall 103 at first end 109, each gripping finger 119 being generally L-shaped in longitudinal cross-section. As can be appreciated, with abutment fingers 117 contacting chassis 12, placement of bezel assembly 25 into its locked position causes gripping fingers 119 to engage chassis 12 and urge bezel 65 rearward, as will be described further in detail below.

Latch 69 is pivotally mounted onto first and second sidewalls 105 and 107 of ejector 67 about a pin 121 and serves to releasably secure bezel assembly 25 in its locked position. As will be described further in detail below, with bezel assembly 25 in its locked position, latch 69 can be disposed in a first position in engagement with tab 86 of bezel 65, thereby securing ejector 67 in its substantially vertical position. Furthermore, latch 69 can be pivoted into a second position in disengagement from tab 86, thereby enabling ejector 67 to be disposed in its substantially horizontal position.

Latch 69 includes a first end 121 and a second end 123. Latch 69 also includes an arcuate surface 125 proximate first end 121, surface 125 being sized and shaped to contour to the finger of an operator. Second end 123 of latch 69 is shaped to include a ratchet, or tooth, 127 which is sized and shaped to releasably engage tab 86.

A coil spring 129 is wound onto pin 121 and includes a first end 131 and a second end 133. First end 131 of coil spring 129 is fixedly mounted onto ejector 67 and second end 133 is fixedly mounted onto latch 69. As can be appreciated, coil spring 129 resiliently urges latch 69 into its first position in engagement with tab 86.

As shown in FIG. 3, adaptive spring 23 is preferably a generally L-shaped, heat-treated, leaf spring. However, it is to be understood that adaptive spring 23 could be manufactured of different materials and in alternative configurations without departing from the spirit of the present invention.

Adaptive spring 23 comprises a first end 135 and a second end 137. First end 135 of adaptive spring 23 is disposed between first end 45 of front RV spring 43 and top surface 39 of upper carrier sled 15, first end 135 of adaptive spring 23 being fixedly retained in place by screw 46. Second end 137 of adaptive spring 23 is disposed to project down through adaptive spring receptacle 74 and into abutment against a pair of angled, spaced apart, inner ribs 139 which are integrally formed into bezel 65. It should be noted that inner ribs 139 are angled in such a manner so as to flex second end 137 of adaptive spring 23. However, the resilient nature of adaptive spring 23 continuously urges second end 137 into a straightened configuration. As a result, second end 137 of adaptive spring 23 continuously applies a force against inner ribs 139 of bezel 65.

As will be described further in detail below, the continuous force of adaptive spring 23 against inner ribs 139 of bezel 65 serves to ensure that the module 11 is properly loaded within chassis 12, which is a principal feature of the present invention. Specifically, adaptive spring 23 ensures that connector 31 is in continuous, full-connectivity with an associated connector on the mid-plane printed circuit board regardless of manufacturing tolerances in the size of chassis 12. In particular, adaptive spring 23 serves to maintain adequate connection between connector 31 and an associated connector 32 on the mid-plane PCB regardless of the shock and/or vibrational forces created by disk drive 13.

In use, disk drive module 11 can be removably disposed within a portion of data storage system chassis 12 in the following manner. Specifically, referring now to disk drive module 11-1 in FIG. 10, bezel assembly 25 of disk drive module 11-1 is initially disposed in its unlocked position with ejector 67 orientated in its horizontal position. With bezel assembly 25 disposed in its unlocked position, the operator handles bezel assembly 25 and slidably displaces disk drive module 11-1 within an associated receptacle formed in data storage system chassis 12. It should be noted that disk drive module 11-1 is constructed to slide with minimal friction within chassis 12, which is highly desirable.

Referring now to disk drive module 11-2 in FIG. 10, as disk drive module 11-2 is slidably disposed into chassis 12, upper and lower carrier sleds 15 and 19 properly align connector 31 of module 11-2 with a corresponding connector on the mid-plane PCB. Disk drive module 11-2 is slidably disposed into chassis 12 until abutment fingers 117 of bezel assembly 25 contact the front surface of chassis 12. It should be noted that, with abutment fingers 117 in contact with chassis 12, fibre channel connector 31 on module 11 is in neither electrical nor mechanical connection with the corresponding connector on the mid-plane PCB. It should also be noted that, with abutment fingers 117 in contact with chassis 12, disk drive module 11 is in the necessary gripping range to allow for subsequent locking of module 11 within chassis 12.

Referring now to disk drive module 11-3 in FIG. 10, with front and rear RV springs 43 and 49 engaging data storage system chassis 12, ejector 67 is rotated towards its locked position. As ejector 67 rotates towards its locked position, ratchet 127 pivots inward while contacting rounded shoulder 83 of bezel 65. In addition, as ejector 67 is rotated towards its locked position, gripping fingers 119 on ejector 67 engage chassis 12. Once gripping fingers 119 engage chassis 12, continued rotation of ejector 67 translates an inward force onto rounded shoulder 83 of bezel 65. In turn, the inward force of bezel 65 further bends second end 137 of adaptive spring 23, thereby increasing the force applied by adaptive spring 23 against inner ribs 139 of bezel 65. As ejector 67 is further rotated towards its locked position, ratchet 127 projects through opening 85 in bezel 65 and engages tab 86, thereby securing bezel assembly 25 in its locked position. It should be noted that the engagement of ratchet 127 onto tab 86 provides an audible and tactile snap, thereby notifying the user that bezel assembly 25 is disposed in its locked position and that disk drive module 11-3 is properly loaded into chassis 12.

It should be noted that, due to its resilient nature, adaptive spring 23 continuously applies a force against inner ribs 139 of bezel 65. As a result of this force, adaptive spring 23 continuously urges upper and lower carrier sleds 15 and 19 in the rearward direction away from bezel assembly 25. In turn, upper and lower carrier sleds 15 and 19 displace fibre channel connector 31 rearward. As a result, the flexion in adaptive spring 23 serves to rearwardly displace upper and lower carrier sleds 15 and 19 until fibre channel connector 31 is in full, continuous connection with the associated fibre channel connector on the mid-plane PCB.

In this capacity, adaptive spring 23 ensures that fibre channel connector 31 is fully connected at all times with the associated connector on the mid-plane PCB, which is a principal object of the present invention. This feature is considerably important when considering the fact that chassis 12 of data storage system D may differ in size and, in particular, length due to manufacturing tolerances.

The embodiment shown in the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A disk drive module, comprising:
   (a) a disk drive for storing data,
   (b) an upper carrier sled mounted onto said disk drive,
   (c) a lower carrier sled mounted onto said disk drive,
   (d) a bezel assembly mounted onto said upper and lower carrier sleds, and
   (e) an adaptive spring having a first end fixedly mounted onto said upper carrier sled and a second end disposed against said bezel assembly, said adaptive spring resiliently urging said bezel assembly away from said upper carrier sled.

2. The disk drive module as claimed in claim 1 wherein said disk drive module is adapted to be slidably mounted into the chassis of a data storage system.

3. The disk drive module as claimed in claim 2 wherein said disk drive comprises a disk drive printed circuit board and a connector mounted onto the printed circuit board.

4. The disk drive module as claimed in claim 3 wherein said connector is a fiber channel connector.

5. The disk drive module as claimed in claim 1 wherein each of said upper and lower carrier sleds comprise a front end, a rear end, a top surface and a bottom surface.

6. The disk drive module as claimed in claim 5 wherein said upper and lower carrier sleds are manufactured of a dense metal material, such as zinc.

7. The disk drive module as claimed in claim 6 wherein said upper and lower carrier sleds are manufactured using conventional die casting techniques.

8. The disk drive module as claimed in claim 5 wherein said upper carrier sled comprises a front rotational vibration (RV) spring and a rear rotational vibration (RV) spring.

9. The disk drive module as claimed in claim 8 wherein said front RV spring is a leaf spring which includes a first end affixed onto the top surface of said upper carrier sled and a second end projecting at angle away from the top surface of said upper carrier sled.

10. The disk drive module as claimed in claim 9 wherein said rear RV spring is a leaf spring which includes a first end which is wrapped around the rear end of said upper carrier sled and is affixed onto the bottom surface of the upper carrier sled and a second end which is retained against the top surface of said upper carrier sled by a pair of tabs formed onto said upper carrier sled.

11. The disk drive module as claimed in claim 5 wherein said bezel assembly is slidably snap mounted onto said upper and lower carrier sleds.

12. The disk drive module as claimed in claim 11 wherein a finger is integrally formed onto and projects perpendicularly out from the bottom surface of the upper carrier sled and is sized and shaped to project into a finger receptacle formed in said bezel assembly.

13. The disk drive module as claimed in claim 12 wherein a ratchet is integrally formed onto the top surface of the lower carrier sled and is sized and shaped to snap-fit into an opening defined by a flexible tab formed into said bezel assembly.

14. The disk drive module as claimed in claim 5 wherein said bezel assembly comprises,
   (a) a bezel,
   (b) an ejector pivotally mounted onto said bezel, said ejector capable of being disposed between a first position and a second position, and
   (c) a latch pivotally mounted onto said ejector, said latch releasably engaging said bezel to secure said ejector in its second position.

15. The disk drive module as claimed in claim 14 wherein said bezel is an elongated member which comprises a top surface, a bottom surface, a front surface, a back surface, a left side surface and a right side surface.

16. The disk drive module as claimed in claim 15 wherein the top surface of said bezel is shaped to define an adaptive spring receptacle which is sized and shaped to receive said adaptive spring.

17. The disk drive module as claimed in claim 15 wherein the front surface and the rear surface of said bezel are each shaped to include a finger receiving, inward curvature.

18. The disk drive module as claimed in claim 15 wherein said bezel is shaped to include a plurality of openings, said plurality of openings enabling air to pass through said bezel.

19. The disk drive module as claimed in claim 15 wherein a plurality of dimples are formed onto the left side surface and the right side surface of said bezel.

20. The disk drive module as claimed in claim 15 wherein said bezel and said ejector are constructed of a conductive, anti-static resin.

21. The disk drive module as claimed in claim 15 wherein, with said ejector disposed in its first position, said ejector extends generally perpendicular to said bezel and, with said ejector disposed in its second position, said ejector extends generally parallel to said bezel.

22. The disk drive module as claimed in claim 15 wherein said ejector is generally U-shaped in lateral cross-section and includes a top wall, a first sidewall and a second sidewall.

23. The disk drive module as claimed in claim 15 wherein an arcuate recess is formed into each of said first and second sidewalls of said ejector.

24. The disk drive module as claimed in claim 15 wherein a pair of abutment fingers and a pair of gripping fingers are formed onto the top wall of said ejector.

25. The disk drive module as claimed in claim 1 further comprising an upper isolation pad disposed between said disk drive and said upper carrier sled and a lower isolation pad disposed between said disk drive and said lower carrier sled, said upper and lower isolation pads reducing rotational vibrations created by said disk drive.

* * * * *